United States Patent [19]

Matsubara et al.

[11] 4,341,938
[45] Jul. 27, 1982

[54] METHOD AND APPARATUS FOR SEAM-WELDING STEEL PIPES

[75] Inventors: Hiroyoshi Matsubara; Kenji Takeshige, both of Fukuyama; Tatsumi Osuka, Tokyo; Takashi Nagamine; Osamu Hirano, both of Fukuyama; Jinkichi Tanaka, Yokohama; Itaru Watanabe, Yokohama; Motoaki Suzuki, Yokohama, all of Japan

[73] Assignee: Nippon Kokan Kabushiki Kaisha, Tokyo, Japan

[21] Appl. No.: 215,757

[22] Filed: Dec. 12, 1980

Related U.S. Application Data

[63] Continuation of Ser. No. 24,697, Mar. 28, 1979, abandoned.

[51] Int. Cl.³ .............................................. B23K 9/02
[52] U.S. Cl. ................................ 219/61; 219/60.2; 219/60 R; 219/123; 174/15 WF
[58] Field of Search ................ 219/59.1, 61, 61.1, 219/137 R, 60.2, 123, 60 R; 174/32, 36, 15 WF; 307/89–91

[56] References Cited

U.S. PATENT DOCUMENTS 1,625,125  4/1927  Latour ................................. 174/32
3,147,389  9/1964  Carlson .......................... 307/90 X
4,107,503  8/1978  Koshiga et al. ...................... 219/61
4,145,594  3/1979  Koshiga et al. ...................... 219/61
4,238,659 12/1980  Koshiga et al. ...................... 219/61

FOREIGN PATENT DOCUMENTS 2162567  7/1973  France ............................... 219/123

Primary Examiner—B. A. Reynolds
Assistant Examiner—M. Paschall
Attorney, Agent, or Firm—Frishauf, Holtz, Goodman and Woodward

[57] ABSTRACT

A method of longitudinally seam-welding steel pipes comprises the steps of providing a conductive net-like enclosure tube around a cable for supplying a direct electric current from the power source to the welding head; and conducting a direct electric current through the enclosure tube and through the steel pipe in a direction opposite to that in which the direct current runs through the cable. Apparatus for longitudinally seam-welding steel pipes comprises an electrical cable coupled to a welding head, a net tube surrounding the cable, and a device for supplying a direct electric current to the cable in a first direction and to the net enclosure tube and steel pipe in the opposite direction. The direct currents flowing in the enclosure tube and in the steel pipe is adjustably controlled to minimize the magnitude of a magnetic field created around the net enclosure tube and producing a welded steel pipe seam.

13 Claims, 3 Drawing Figures

METHOD AND APPARATUS FOR SEAM-WELDING STEEL PIPES

This is a continuation of application Ser. No. 24,697, now abandoned, filed Mar. 28, 1979.

BACKGROUND OF THE INVENTION

This invention relates to a method and apparatus for longitudinally seam-welding steel pipes manufactured by a U-ing/O-ing/expanding process which is abbreviated as an UOE process. This seam is generally produced by the use of a seam welder by welding the inner surface of the longitudinal groove defined by the welded edges of a steel pipe and then the outer surface of the longitudinal groove.

According to the prior art submerged arc type steel pipe seam-welding apparatus shown in FIG. 1, a boom or horizontal support arm 12 is carried by a traction carriage 13 and guide carriage 14. A welding head 11 is fixed to the front end of the arm 12. The welding head 11 is positioned over a portion of the longitudinal groove 15 of a steel pipe 16 which is to be welded. A flux is applied to the welding spot. An electrode wire 17 is conducted by feed rollers 18 through the welding head 11 to the welding spot. A large alternating current is supplied from a terminal of a power source 19 to the electrode wire 17 through an electrical insulative covered conductor 20 (hereinafter referred to as "cable 20") and welding head 11 to produce arcs between the leading end of the electrode wire 17 and the welded spot of the steel pipe 16. Where, under this condition, the traction carriage 13 is hauled, a longitudinal seam 21 is formed on the inner surface of the groove 15. The steel pipe 16 is connected to the other terminal of the power source 19 through a line 22. After an inner seam 21 is formed on the inner surface of the seam 15 of the steel pipe 16, an outer seam is produced on the outer surface thereof by a process similar to the above-mentioned process, thereby completing the seam-welding process.

The prior art submerged arc welding method utilizing an alternating electric current has a drawback that the properties of the steel pipe are much deteriorated due to the fact that a large heat input arises when the longitudinal seam is formed on a steel pipe.

In order to overcome this disadvantage, there has been proposed a method and apparatus for longitudinally seam-welding steel pipes wherein a large direct electric current with a low voltage flows through a cable to produce an arc with a moderate amount of heat input as shown in U.S. Pat. No. 4,071,732.

In the case, however, where a seam is produced particularly on the inner surface of the longitudinal groove of a steel pipe by such an direct current seam-welding method, a large current running through the cable 20 gives rise to the creation of a strong circular magnetic field around the cable 20.

Thus, a magnetic circuit is generated along the periphery of the steel pipe 16 having a high magnetic permeability and the surfaces of the groove 15 are magnetically saturated. As a result, leakage flux is produced in the groove 15. During the direct current seam welding process, however, an arc which is a flow of electrified particles lying within the range of the leakage magnetic flux is inevitably deflected in a direction along the groove 15 in accordance with Fleming's left-hand law, leading to the so-called magnetic blow. The plasma jet stream produced at the forward end of the electrode wire acts as a dynamic pressure on the molten metal and irregularly vibrates the molten pool. This results in the ocurrence of welding defects such as undercut of bead, humping bead and lack of fusion of base metal. In addition, the arc is produced at one lateral side of the electrode wire, leading to the melting of said lateral side. Accordingly, molten droplets fail to smoothly transfer from the electrode wire to the base metal, thereby creating coarse spattering. Further, the above-mentioned drawbacks are also encountered in the production of an outer seam on the outer surface of the groove of a steel pipe.

It is accordingly the object of this invention to provide a method and apparatus for seam-welding a steel pipe, wherein electric current is made to run through a conductive enclosure tube surrounding the electrical insulative covered conductor (i.e., cable) in a direction opposite to that in which an electric current is conducted through the cable to prevent the steel pipe from being magnetized.

SUMMARY OF THE INVENTION

According to this invention, there is provided a steel pipe seam-welding method which comprises the steps of providing a conductive enclosure tube spatially around a cable for supplying a first direct electric current to a welding head; and introducing a second direct electric current through said conductive enclosure in a direction opposite to that of first direct electric current and in an amount substantially to extinguish a magnetic field created by the direct current.

This invention further provides a steel pipe seam-welding apparatus which comprises a traction carriage reciprocatingly movable along a steel pipe; a welding head set apart from the traction carriage and immovable with respect thereto and so arranged as to produce a seam on a longitudinal groove of the steel pipe while being hauled by the traction carriage; a cable for connecting the welding head to one of terminals of a power source thereby to supply a direct current to the welding head; and a conductive enclosure tube which spatially surrounds the cable and which is supplied with a direct current traveling in a direction opposite to that in which the direct current passes through the cable.

For the passage of the direct current through the conductive enclosure tube in the above-mentioned opposite direction, the forward end of the conductive enclosure tube is electrically connected to the steel pipe, and the rear end of the conductive enclosure tube is electrically connected to the other terminal of the power source.

Since a direct current runs through the cable and conductive enclosure tube in the opposite directions, a magnetic field created outside of the conductive enclosure tube is minimized in magnitude, thereby noticeably suppressing a leakage flux in the longitudinal groove of the steel pipe and consequently ensuring the seam-welding of the proper steel pipe.

DETAILED DESCRIPTION

Figure 1:
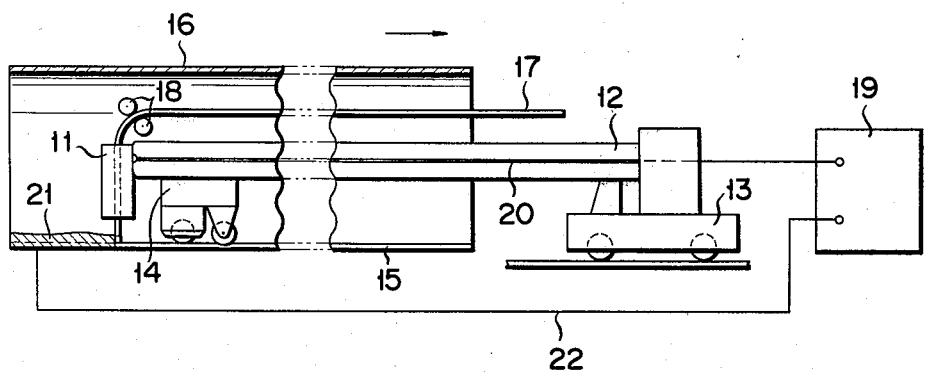
FIG. 1 is a schematic longitudinal sectional view of a prior art steel pipe seam-welding apparatus.
Figure 2:
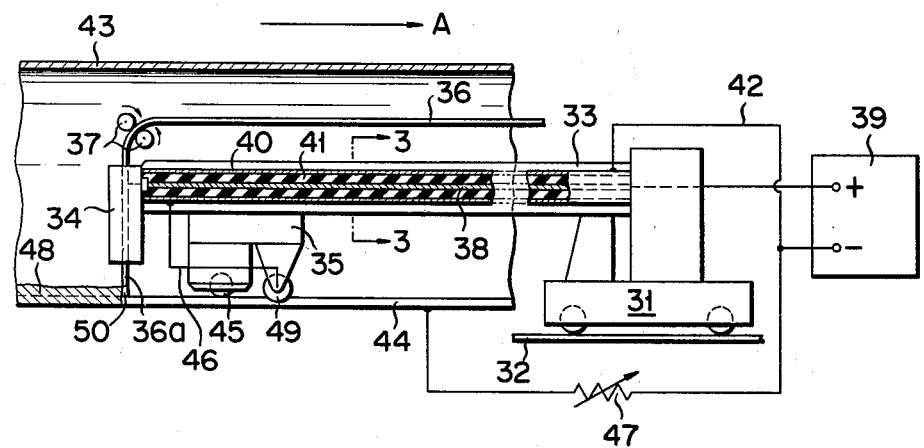
FIG. 2 is a schematic longitudinal sectional view of a steel pipe seam-welding apparatus embodying this invention.

Referring to FIG. 2, the steel pipe seam-welding apparatus of this invention comprises a traction carriage 31 traveling on rails 32; a boom or support arm 33 extending parallel with the rails 32 and fixed at one end to the traction carriage 31; a welding head 34 mounted on the other end of the support arm 33; and a guide carriage 35 provided at the forward end of the support arm 33 to hold said other end thereof.

An electrode wire 36 supplied from an electrode wire feeder (not shown) is inserted downward into the welding head 34 by the rotation of feed rollers 37 driven by a drive device (not shown).

An electrical insulative covered conductor 38 (hereinafter "cable 38") is set parallel with the support arm 33, and electrically connected at one end to a positive terminal of a power source 39 and at the other end to the electrode wire 36 through the welding head 34.

Figure 3:
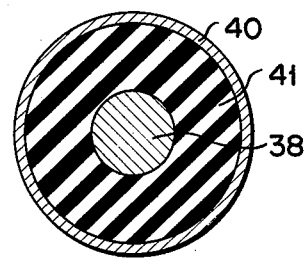
FIG. 3 is a cross sectional view of a cable on line 3—3 of FIG. 2.

As best shown in FIG. 3, the cable 38 is concentrically inserted into a net-like enclosure tube 40 made of electrically conductive material. Electric insulating material such as rubber is filled between the outer peripheral wall of the cable 38 and the inner peripheral wall of the enclosure tube 40. Obviously, it is possible to insert the cable 38 previously surrounded by electric insulating material 41 into the enclosure tube 40. Though held by the support arm 33, the enclosure tube 40 is electrically insulated from the support arm 33, welding head 34 and traction carriage 31. The rear end of the enclosure tube 40 is connected to a negative terminal of the power source 39, for example, by a line 42.

A connection roller 49 is mounted on the guide carriage 35 to be electrically connected to the forward end of the enclosure tube 40 by a line 46. A steel pipe 43 is connected to the negative terminal of the power source 39 through a variable resistor 47. The steel pipe 43 is set parallel with the cable 38 to cause the longitudinal groove 44 of the steel pipe 43 to face that end portion 36a of the core wire 36 which protrudes from the welding head 34.

FIG. 2 shows the arrangement of the steel pipe seam-welding apparatus of this invention for producing a seam 48 on the inner surface of the longitudinal groove 44 of the steel pipe 43. The welding head 34 and the support arm 33 are received in the steel pipe 43. The connection roller 49 for electrically connecting the steel pipe 43 to the forward end of the conductive enclosure tube 43 is engaged with the longitudinal groove 44 of the steel pipe 43. That end portion 36a of the electrode wire 36 which protrudes from the welding head 34 is normally positioned exactly above the groove 44. A transfer ball 45 provided on the guide carriage 35 leads the welding head 34 to that spot in the steel pipe 43 at which the welding begins and is separated from the steel pipe 43 during the welding process. The roller 49 engages the longitudinal groove 44 to position the welding head 34 above the groove 44 at a prescribed distance.

There will now be described by reference to FIG. 2 the operation of a steel pipe seam-welding apparatus embodying this invention. The connection roller 49 is set in the groove 44, and the protruding end 36a of the electrode wire 36 is spatially located above that part of the steel pipe 43 where an inner seam begins to be welded. A large direct electric current is supplied from the power source 39 to the electrode wire 36 through the cable 38 and welding head 34, thereby generating arcs 50 between the protruding end 36a of the electrode wire 36 and the facing portion of the longitudinal groove 44 of the steel pipe 43. The traction carriage 31 is hauled in the direction of the indicated arrow A by a driving device of the known type. Thus, an inner seam 48 is successively formed in the groove 44. The electrode wire 36 is continuously carried forward by the feed rollers 37 in an amount corresponding to that portion of the electrode wire 36 which is progressively consumed as welding proceeds.

Where, in this case, a large current flows through the cable 38, strong magnetic field is formed concentrically with the cable 38. A current running from the cable 38 to the electrode wire 36 is conducted to the steel pipe 43. Part of the current is carried to the forward end of the enclosure tube 40 through the connection roller 49 and the line 46, and thereafter is returned from the rear end of the enclosure tube 40 to the negative terminal of the power source 39 through the line 42. The remainder of the current returns to the negative terminal of the power source 39 through the variable resistor 47.

A current running through the enclosure tube 40 generates a strong magnetic field concentrically around the enclosure tube 40. However, this current travels in a direction opposite to that in which a current passes through the cable 38. Therefore, a magnetic field created by the enclosure current offsets that produced by the cable current. The enclosure current can be chosen to produce a magnetic field having a magnitude substantially to extinguish a magnetic field resulting from a current passing through the cable 38 by controlling the resistance of the variable resistor 47. This arrangement practically suppresses the occurrence of a magnetic circuit around the peripheral surface of the steel pipe 43, thereby substantially eliminating the occurrence of a leakage magnetic flux and consequently a magnetic blow in the longitudinal groove 44 of the steel pipe 43. As a result, a proper inner seam can be produced on the inner surface of the groove 44.

After the formation of the inner seam, an outer seam is produced in the same manner, description thereof being omitted.

Where the conductive enclosure tube 40 is formed of a ferromagnetic material such as iron, a magnetic field prevailing around the enclosure tube 40 is extremely reduced due to a shielding effect, allowing for the passage of a small current through the enclosure tube 40.

Now let it be assumed that a steel pipe has an outer diameter of 24 to 56 inches (about 60 to 140 centimeters); a cable 38 has a diameter of 15 millimeters; and a direct electric current of 800 amperes is running through the cable 38. In this case, experiments show the following facts. With the prior art direct electric current steel pipe seam-welding process the magnetic density in the groove of a steel pipe was 200 to 300 Gausses or in the proximity thereof. In contrast, where an iron net enclosure tube was used, the longitudinal groove of a steel pipe was magnetized to 100 to 150 Gausses or the proximity thereof even though no reverse current was caused to flow through the enclosure tube. Namely, this rate of magnetization only accounted for about half of that which was observed with the prior art steel pipe seam-welding process. When the reverse current was caused to travel through the iron enclosure tube, the magnetic density in the longitudinal groove could be reduced to approximately zero Gauss. Accordingly, it was proved that where a steel pipe seam was welded by the method of this invention, the phenomenon of a magnetic blow was extremly suppressed, making it possible to produce a proper seam.

In the above-mentioned example of this invention, the cable 38 was connected to the positive terminal of the power source 39. The iron net enclosure tube 40 and steel pipe 43 were connected to the negative terminal of the power source 39. Obviously, the reverse arrangement well serves the purpose.

What we claim is:

1. In a steel pipe seam-welding method comprising conducting an electrode wire through a welding head; causing an end of the electrode wire to face a longitudinal groove of a steel pipe which is to be welded together; setting the welding head above said groove; and supplying a first direct electric current to the welding head from a terminal of a power source through an elongated electrically insulative covered conductor extending lengthwise of the steel pipe, thereby welding said groove, said first direct electric current creating a first magnetic field around said elongated conductor, the improvement comprising:
surrounding said elongated conductor with an elongated conductive enclosure tube which is substantially coaxial with said elongated conductor, said enclosure tube and said elongated conductor being located within said steel pipe and extending from the vicinity of said welding head and being substantially coaxial with said steel pipe;
electrically connecting an end portion of said enclosure tube in the vicinity of said welding head to a portion of said steel pipe located in the vicinity of said welding head;
supplying a second direct electric current from another terminal of said power source through said elongated enclosure tube in a direction opposite to a direction in which the first direct electric current passes through said elongated conductor to create a second magnetic field around said elongated enclosure tube;
supplying a direct electric current to a portion of said steel pipe remote from said welding head from said another terminal of said power source to conduct direct electric current through said steel pipe in said direction opposite to that in which the first direct current passes through said elongated conductor; and
adjustably controlling the magnitudes of said direct electric currents flowing through said elongated enclosure tube and said steel pipe to thereby control said second magnetic field so that it substantially cancels, at least at said steel pipe, said first magnetic field which has lines of force in a direction opposite to said second magnetic field.

2. The method according to claim 1, wherein the enclosure tube extends between the vicinity of the welding head and the power source, and the other end of said enclosure tube being electrically connected to said another terminal of the power source.

3. The method according to claim 2, wherein the step of adjustably controlling the magnitudes of said direct electric currents flowing through said elongated enclosure tube and said steel pipe comprises adjusting the amount of direct electric current supplied to said steel pipe from said another terminal of said power source.

4. The method of claim 3, wherein said direct electric current supplied to said steel pipe is adjusted by means of a variable resistor coupled between said steel pipe and said another terminal of said power source.

5. In a longitudinal seam-welding apparatus for steel pipes including a traction carriage reciprocatingly movable along a steel pipe, a welding head set apart from the traction carriage and immovably mounted with respect to the traction carriage, the welding head being arranged to produce a seam in a longitudinal groove of the steel pipe while being hauled by the traction carriage, and an elongated electrically insulative covered conductor for electrically connecting the welding head to a terminal of a power source to supply a first direct electric current to said welding head, said first direct electric current creating a first magnetic field around said elongated conductor, the improvement comprising:
an elongated conductive enclosure tube spaced from and substantially coaxially surrounding said elongated conductor, said enclosure tube and said elongated conductor being located within said steel pipe and extending from the vicinity of said welding head and being substantially coaxial with said steel pipe;
means for electrically connecting an end portion of said enclosure tube in the vicinity of said welding head to a portion of said steel pipe located in the vicinity of said welding head;
first connection means coupled between another terminal of said power source and a portion of said elongated enclosure tube remote from said welding head to conduct a second direct electric current through said elongated enclosure tube in a direction opposite to that in which the first direct current passes through said elongated conductor to create a second magnetic field around said elongated enclosure tube;
second connection means coupled between a portion of said steel pipe remote from said welding head and said another terminal of said power source to conduct direct electric current through said steel pipe in said direction opposite to that in which the first direct current passes through said elongated conductor; and
adjusting means coupled to at least one of said first and second connection means for adjusting the magnitude of said direct electric currents flowing through said elongated enclosure tube and said steel pipe to thereby adjust said second magnetic field so that it substantially cancels said first magnetic field at least at said steel pipe.

6. The apparatus according to claim 5, wherein an electric insulating material is provided between an inner wall of the elongated conductive enclosure tube and an outer wall of the elongated conductor.

7. The apparatus according to claim 5, wherein the elongated conductive enclosure tube is formed of a net tube.

8. The apparatus according to claim 7, wherein the net tube is made of a ferromagnetic material.

9. The apparatus according to claim 7, wherein an electric insulating material is filled between an inner wall of the elongated conductive enclosure tube and an outer wall of the elongated conductor.

10. The apparatus according to claim 5, wherein said adjusting means comprises a variable resistor.

11. The apparatus according to claim 5, wherein said adjusting means is coupled between said pipe and said another terminal of said power source for adjusting the magnitude of said direct electric currents flowing through said elongated enclosure tube and said steel pipe.

12. The apparatus according to claim 5 or 11, wherein said adjusting means comprises a variable resistor.

13. The apparatus according to claim 5, wherein said enclosure tube extends between the vicinity of said welding head and said power source, and the other end of said enclosure tube being electrically connected to said another terminal of said power source.

* * * * *